(No Model.)
T. H. BOTTOMLEY.
TIRE TIGHTENER.
No. 358,253. Patented Feb. 22, 1887.
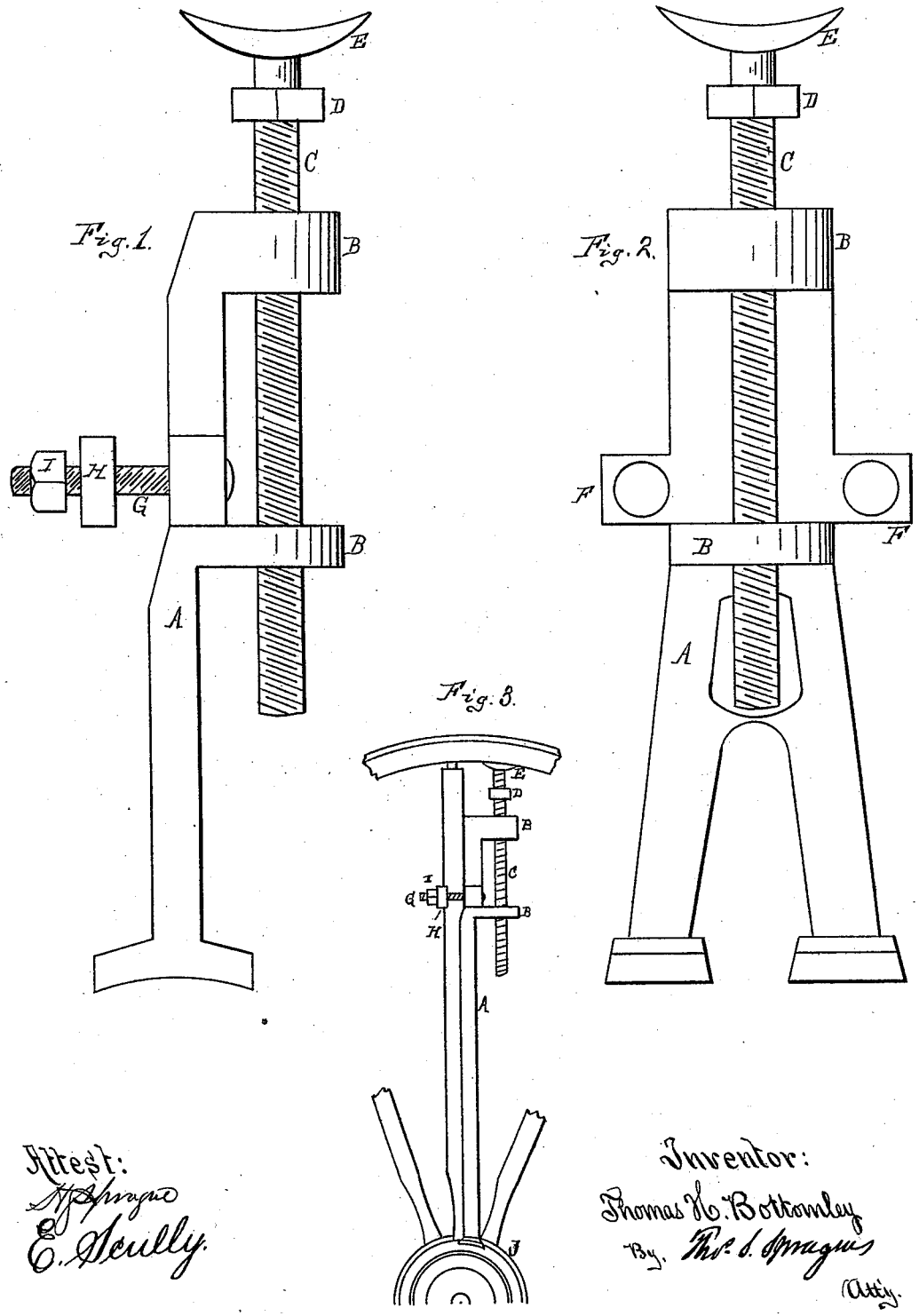

UNITED STATES PATENT OFFICE.

THOMAS H. BOTTOMLEY, OF CAPAC, MICHIGAN.

TIRE-TIGHTENER.

SPECIFICATION forming part of Letters Patent No. 358,253, dated February 22, 1887.

Application filed December 23, 1886. Serial No. 222,388. (No model.)

*To all whom it may concern:*

Be it known that I, THOMAS H. BOTTOMLEY, of Capac, in the county of St. Clair and State of Michigan, have invented new and useful Improvements in Tire-Tighteners; and I do hereby declare that the following is a full, clear, and exact description thereof, reference being had to the accompanying drawings, which form a part of this specification.

This invention relates to certain new and useful improvements in tire-tighteners.

The invention consists in the peculiar construction and arrangement of devices for expanding the rims or fellies of wheels in such a manner that pieces of leather or other suitable material may be inserted between the ends of the spokes and the fellies around the tenon, and thus expand the felly or rim of the wheel to the tire, instead of, as in the ordinary manner, removing the tire, cutting the same, and again shrinking it upon the wheel, all as more fully hereinafter set forth.

Figure 1 is a side elevation of my improved device. Fig. 2 is a front elevation, and Fig. 3 is a plan showing the application of the device to a wheel.

In the accompanying drawings, which form a part of this specification, A represents a suitable standard, the foot of which is bifurcated, as shown, and this foot is provided with two laterally-projecting brackets, B, through which a screw, C, is tapped, said screw being adapted to operate by means of a nut or squared portion, D. The outer or upper end of this screw is provided with a suitable pad or saddle, E. Each edge of the standard A is provided with a lug, F, through which bolts G pass, and also through a clamping-plate, H, the outer ends of such bolts receiving nuts I. In practice the standard A is placed between two adjoining spokes of the wheel, the feet or bifurcation straddling one spoke and resting upon the hub of the wheel J, the back face of the standard resting against the spoke, as shown in Fig. 3, and to which it is rigidly secured by means of the clamp-plate H, rods G, and nuts I, as is clearly shown in said last-mentioned figure. The screw C is now turned in the proper direction to advance the saddle E up against the felly or rim of the wheel, and thus force such rim outwardly, leaving a slight space between the shoulder at the tenon of the spoke and the inside edge of the rim, into which space is fitted a piece of leather or other suitable material. The device is moved from point to point upon the wheel, as in the experience of the wheelwright will be to the best advantage and to prevent an undue "dishing."

While I have shown and described means for clamping the standard and spoke, I do not desire to confine myself strictly to its use, as in many cases it will not be necessary, its only use and function being to prevent the drawing of the spoke from the hub, rather than forcing the rim from an engagement with the tenon upon the outer end of the spoke.

What I claim as my invention is—

In a device for tightening tires upon carriage-wheels, the combination of the standard A, provided with brackets B, screw C, tapped through said brackets B, and carrying a saddle, E, upon its outer end, with rods G, clamp-plate H, and nuts I, when constructed, arranged, and operating substantially in the manner and for the purposes described.

THOMAS H. BOTTOMLEY.

Witnesses:
 H. S. SPRAGUE,
 E. SCULLY.